Patented Oct. 27, 1953

2,657,207

UNITED STATES PATENT OFFICE 2,657,207

PREPARATION OF ISOCINCHOMERONIC ACID

Henry Henderson Herring, Jr., Woodbury, N. J., assignor to E. I. du Pont de Nemours and Company, Wilmington, Del., a corporation of Delaware No Drawing. Application February 27, 1951, Serial No. 213,057

4 Claims. (Cl. 260—270)

This invention relates to a new and improved process for the manufacture of metal salts of isocinchomeronic acid, and of the free acid itself, and more particularly to such a process giving increased yields and improved quality of product.

This is a continuation-in-part of my co-pending application, Serial No. 4,699, filed January 27, 1948, now abandoned.

It is well known that the controlled oxidation of various alkylpyridines, using suitable oxidizing agents, brings about the formation of certain amounts of the corresponding carboxylic acids. Oxidations have been effected by means of chromates, peroxides, and potassium permanganate, for example, and nitric acid and nitrogen oxides have likewise been proposed. Many of the carboxylic acids so produced are important chemical products, either per se or as intermediates in the preparation of other compounds. Isocinchomeronic acid, for example, is such a potentially important chemical intermediate. Its use has been suggested in dyeing, for example, particularly for the manufacture of vat dyes which will not harm the fiber. It may also be decarboxylated to nicotinic acid and for this purpose high purity is desirable. The salts of isocinchomeronic acid are likewise useful chemical materials. Isocinchomeronic acid may be prepared, for example, by the oxidation of 2,5-dialkylpyridines by means of concentrated nitric acid at elevated temperature and under pressure greater than atmospheric, as in U. S. Patent 2,524,957. In accordance with this process, however, much of the dicarboxylic acid remains in solution in the mother liquor and must be recovered therefrom by subsequent treatment, such as by precipitation of the copper salt. This subsequent treatment entails considerable consumption of time and loss in potential yield, and the product obtained is not of the highest quality desired.

An object of the present invention is an improved process for the preparation of isocinchomeronic acid by the nitric acid oxidation of 2,5-dialkylpyridines. A further object is such a process for the production first of metallic salts of isocinchomeronic acid. A still further object is an improved process for the preparation of metallic salts of isocinchomeronic acid and subsequently of the free acid by the oxidation of a 2,5-dialkylpyridine with the employment of nitric acid. A further object is such a method in which the starting material is 5-ethyl-2-methylpyridine and in which excellent yields are obtained and a product of superior quality. Additional objects will be disclosed as the invention is described more at length hereinafter.

I have found that the foregoing objects are accomplished when I employ a procedure for the oxidation process which comprises heating at an elevated temperature and under superatmospheric pressure a 2,5-dialkylpyridine and concentrated nitric acid, and carrying out the reaction in the presence of a metallic salt of an inorganic acid. A metal salt of isocinchomeronic acid results therefrom and the free acid may be obtained by heating the separated metal salt with an excess of alkali, filtering to recover the metal oxide, and acidifying the filtrate with sulfuric or other strong inorganic acid to a pH at which substantially all of the carboxylic acid is present as free acid, which may then be separated. Copper nitrate has been found to be very advantageous for use in the process and this may be introduced into the reaction as such in the solid or dissolved state, or copper oxide may be added, which is converted to the nitrate by reaction with the nitric acid present. The process will be shown more clearly by the following examples, which are not to be taken as limiting in any way.

Example 1

Three grams of 5-ethyl-2-methylpyridine was introduced with cooling beneath the surface of 30 grams of 60% nitric acid, and 6 grams of cupric nitrate, $Cu(NO_3)_2 \cdot 3H_2O$, was added to the solution. This solution was placed in a heavy-walled glass tube, having an internal volume of 900 cc. The tube was sealed, placed in a steel jacket, and heated at 180° C. for 45 min. At the end of the reaction, the tube was cooled and opened, and the contents removed. Copper diisocinchomeronate, having the formula $(C_7H_4O_4N)_2Cu$, in the form of large blue crystals, was filtered off, washed, and dried at 110° C. The yield of the copper salt from the 5-ethyl-2-methylpyridine amounted to 94.5%. In this example, the copper present constituted an excess of 100% over that required to form the salt, and the net ratio of nitric acid to 5-ethyl-2-methylpyridine by weight was 6.

The above copper diisocinchomeronate was then digested with an excess of sodium hydroxide in dilute aqueous solution. This caused the precipitation of the copper oxide, which was separated by filtration. Sulfuric acid was then added to the filtrate to give a pH value of 2.5, whereupon the free isocinchomeronic acid precipitated and was washed and dried. A yield of 88.2% of the free acid was obtained, so that the over-all yield from 5-ethyl-2-methylpyridine was 83.3%.

An excellent quality of both the copper salt and free isocinchomeronic acid was obtained.

The present example describes a starting run, in which fresh copper nitrate was used. In succeeding runs, the copper would be reused, with only sufficient addition of fresh copper nitrate or oxide to replace losses incident to handling. The procedure would be to concentrate the filtrate from the copper diisocinchomeronate to a 60% nitric acid concentration and to add to this the copper oxide in moist form, precipitated during the regeneration of free isocinchomeronic acid.

Example 2

In this example, generally the same oxidation conditions were followed and the same quantities of 5-ethyl-2-methylpyridine, nitric acid and copper were used, a variation coming in the fact that the excess nitric acid and copper from a previous run were used, the copper both from the concentrated acid filtrate and from the precipitated copper oxide. After removal of the materials from the reactor, the copper diisocinchomeronate was filtered and the wet salt was washed free from contaminants. While still in moist form, the material was heated for one-half hour with a 25% excess of sodium hydroxide, in the form of a 7% solution. The separated copper oxide was filtered hot, and the cooled filtrate was acidified with 6N $H_2SO_4$ to a pH of 2.5. The isocinchomeronic acid precipitated from solution and was washed and dried. The over-all yield of this acid from the 5-ethyl-2-methylpyridine amounted to 94.5%. The high quality of the product was shown by the fact that the neutralization equivalent was determined as 83.53, which value checks within limits of experimental error the value of 83.56 for pure material.

Example 3

Copper nitrate in the amount of 50 grams, as $Cu(NO_3)_2 \cdot 3H_2O$, was mixed with 35 grams of 60% nitric acid, and 25 grams of 5-ethyl-2-methylpyridine was added. The whole was introduced into a glass pressure reactor. Nitric acid of 60% strength and in the amount of 115 grams was fed into the reactor contents over a period of 1 hour and 25 min. During this feeding period, the mixture was held at a temperature of 180° C. and the pressure at 150 pounds per square inch (gage). An additional cooking period of 10 minutes under the same conditions was given the charge. The net ratio of nitric acid to the pyridine derivative by weight was 3.6, and a 100% excess of copper was used. The copper salt of isocinchomeronic acid was separated and purified as in Example 1, and a yield of 93.2% was obtained.

Example 4

Nitric acid of 60% strength and in the amount of 9 pounds was introduced into a 4-gallon stainless-steel reactor. In a separate vessel, 1.5 pounds of 5-ethyl-2-methylpyridine was dissolved in another 9 pounds of 60% nitric acid. The acid in the reactor was heated and the second solution was then fed in, an additional 1.5 pounds of 60% nitric being used to wash out the feed line, so that a total of 19.5 pounds of acid was present, i. e., a net ratio by weight of nitric acid to 5-ethyl-2-methylpyridine of 7.8. Copper oxide in an amount of 2 pounds had previously been added to the acid in the reactor. The mixture was then kept at a temperature of about 180° C. for a total period of around 2½ hours, a pressure of 210 pounds per square inch (gage) being maintained by periodic venting. At the end of the reaction, the contents were removed from the reactor, and the copper diisocinchomeronate separated as before a yield of 82% being obtained.

The copper salt thus obtained was digested with a 50% excess of sodium hydroxide in the form of a 20% solution, and the precipitated copper oxide was filtered off. The filtrate was acidified with sulfuric acid to a pH value of 2.5, and the free isocinchomeronic acid was separated, washed and dried. The amount of free acid obtained was 724 grams, comprising a yield of 94%, based on the copper salt or an over-all yield of 77% from 5-ethyl-2-methylpyridine. The isocinchomeronic acid obtained was of excellent quality.

Example 5

Preparation of a metal salt of isocinchomeronic acid was made in general conformity to the procedure of Example 1, except that, instead of copper nitrate, zinc nitrate was employed; 5 grams of 5-ethyl-2-methylpyridine being used and a 350% excess of the nitrate. The reaction time was 0.5 hour, a temperature of 180° C. being maintained. A yield of 70.7% of the zinc salt was obtained.

Example 6

In accordance again with the procedure of Example 1, a metal salt of isocinchomeronic acid was prepared, but with the use of nickel nitrate, in an excess of 350%. A yield of the nickel salt of isocinchomeronic acid of 73.6% resulted.

Example 7

In accordance with the procedure of Example 1, 3.0 grams 5-ethyl-2-methylpyridine was oxidized by means of 10% nitric acid in a net ratio by weight of nitric acid to 5-ethyl-2-methylpyridine of 6/1 in the presence of 15 grams of copper nitrate, $Cu(NO_3)_2 \cdot 3H_2O$. The reaction time was 2 hours, a temperature of 180° C. being maintained. A yield of copper diisocinchomeronate of 55.4% was obtained. When the reaction time was 3 hours, the yield of copper diisocinchomeronate was 85%.

Example 8

In accordance with the procedure of Example 1, 3.0 grams 5-ethyl-2-methylpyridine was oxidized by means of 30% nitric acid in a net ratio by weight of nitric acid to 5-ethyl-2-methylpyridine of 6/1 in the presence of 15 grams of copper nitrate, $Cu(NO_3)_2 \cdot 3H_2O$. The reaction time was 1 hour, a temperature of 180° C. being maintained. A yield of copper diisocinchomeronate of 85.3% was obtained.

Example 9

In accordance with the procedure of Example 1, 3.0 grams 5-ethyl-2-methylpyridine was oxidized by means of 40% nitric acid in a net ratio by weight of nitric acid to 5-ethyl-2-methylpyridine of 6/1 in the presence of 15 grams of copper nitrate, $Cu(NO_3)_2 \cdot 3H_2O$. The reaction time was 1 hour, a temperature of 180° C. being maintained. A yield of copper diisocinchomeronate of 86.1% was obtained.

The foregoing examples show that high yields of a product having exceptional purity were obtained. The product of Example 2 had a neutral equivalent of 83.53 (83.56 is the theoretical). In general, neutral equivalents of about 83.5 are obtained by my process; whereas, in oxidations by means of concentrated nitric acid without a metal salt, in accordance with the prior art, neutral equivalents of 85–88 have been the rule.

In the process described in the foregoing examples, the starting material may be any 2,5-dialkylpyridine, desirably one with relatively few carbon atoms present in the substituent groups, for example 2,5-dimethylpyridine, 5-ethyl-2-methylpyridine, and the like. Preferably I use the latter compound because it is an organic compound which can readily be prepared synthetically.

In carrying out the oxidation reaction, nitric acid is used, and I find it important to employ an excess of such acid, for example a net nitric acid ratio of over 3 parts by weight of nitric acid to 1 part of 5-ethyl-2-methylpyridine. While the nitric acid ratio cited considers the nitric acid at 100% strength, actually it may be used at any desired practical dilution. I find 60% nitric acid satisfactory for use, but it may be considerably more dilute, if desired. The reaction will be carried out at an elevated temperature, and, in the preparation of isocinchomeronic acid from 5-ethyl-2-methylpyridine, the temperature should be above 140° C., and desirably considerably higher, above 160° C. for example. The reaction will be carried out in a closed vessel and under pressure. The evolution of nitrogen oxides will cause the build-up of pressure and, if desired, a pressure of nitrogen may be used. Maintenance of the pressure at a predetermined value will be found advisable, and I do not wish to be limited with respect to pressure conditions.

An essential feature of the process is the carrying out of the reaction in the presence of a metallic salt of an inorganic or lower aliphatic acid. While copper sulfate or similar metal sulfate, copper acetate, or other salts might be used, the logical salt for use will be a metal nitrate, inasmuch as nitric acid is a necessary reactant, and, by the use of nitrates, the presence of additional acid ions is avoided. The nitrate may be introduced into the reaction as such, but a convenient procedure is to add a metal oxide to the reaction mixture, which becomes converted to the nitrate in the presence of nitric acid. Preferably I employ copper nitrate or a copper compound convertible to the nitrate by means of nitric acid, as particularly satisfactory results appear to be obtained with this metal. Salts of other bivalent metals are applicable, however, for example zinc, nickel, and the like. Desirably a considerable excess of metal salt is used over that required to supply sufficient metal ions to form the metal salt of the pyridinecarboxylic acid. The presence of copper or other metal during the oxidation reaction is advantageous to the process in that, by causing the immediate formation of the stable metal salt, which is insoluble in the nitric acid reaction medium, it inhibits any decarboxylation of the pyridinedicarboxylic acid which might occur. The formation of by-product nicotinic acid, which, in the nitric acid medium, tends to yield the soluble nitrate of nicotinic acid, which is separated from the desired pyridinedicarboxylic acid only with difficulty, is thereby avoided, and higher yields of isocinchomeronic acid of a higher degree of purity are thus made possible.

Furthermore, when metal in adequate amounts is present, the 2,5-dialkylpyridine can be oxidized by dilute nitric acid because the decarboxylation of isocinchomeronic acid which occurs at lower dilutions in the absence of adequate amounts of metal cannot then take place, since the α-carboxyl group, which is the more reactive group and the more subject to decarboxylation, is firmly combined with the metal to form the metal salt, insoluble in the nitric acid medium.

It has been proposed heretofore to use catalytic amounts of metals, such as copper, in the nitric acid oxidation of alkyl-substituted pyridines such as 2,5-dialkylpyridines, but such amounts would not result in complete, immediate conversion of all of the isocinchomeronic acid produced to the insoluble metal salt, thereby removing the acid at once from further reaction. I have found that more than 0.5 gram atom of copper is required in the reaction mixture to effect complete removal of the isocinchomeronic acid as it is formed. Under the conditions of my process, one equivalent of the bivalent metal such as copper, zinc, or nickel reacts with two moles of isocinchomeronic acid, as indicated by the following elemental analyses for the copper, zinc, and nickel salts given below:

| | $(C_7H_4O_4N)_2Cu$ | | $(C_7H_4O_4N)_2Zn$ | | $(C_7H_4O_4N)_2Ni$ | |
|---|---|---|---|---|---|---|
| | Found | Calc. | Found | Calc. | Found | Calc. |
| Percent C | 42.30 | 42.47 | 39.56 | 42.50 | 35.77 | 43.00 |
| Percent H | 1.40 | 2.02 | 2.18 | 2.05 | 2.97 | 2.06 |
| Percent N | 7.50 | 7.08 | 6.12 | 7.20 | 5.70 | 7.16 |
| Percent Metal | 15.28 | 16.07 | 15.33 | 16.45 | 12.95 | 14.98 |

Consequently, more than one equivalent, or 0.5 gram atom, of bivalent metal is required in the reaction mixture to effect complete removal of the isocinchomeronic acid as it is formed, since it may be assumed that the metal salt of isocinchomeronic acid formed has the following structure, for example, although other structures may be possible, such as structures in which the nitrogen atoms of the pyridine nuclei are also bound to form internal salts.

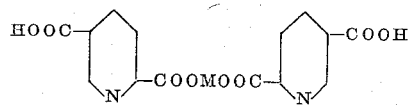

There is thus required one gram atom of metal for each two moles of isocinchomeronic acid produced. In practice, an excess of this amount of metal is required, and a considerable excess assures immediate formation of the metal salt. High yields of the deep-blue copper salt have been obtained with a 10% to 900% excess of cupric nitrate above that calculated to form $(C_7H_4O_4N)_2Cu$ from the 5-ethyl-2-methylpyridine used.

The efficacy of my process is considered to be dependent upon the lack of solubility in nitric acid of the metal salt formed in the nitric acid medium of my process. Copper diisocinchomeronate, for example, is recovered as large, deep-blue crystals which are easily filtered. The salt is essentially insoluble in the nitric acid medium and is less than 0.05 gram soluble in 100 grams of water at 25° C. Copper salts of other pyridinecarboxylic acids, on the other hand, are, for the most part, soluble in nitric acid solution. My process cannot be applied to the preparation of copper quinolinate, for example, because the copper salt of quinolinic acid produced in the nitric acid medium is soluble in the nitric acid and cannot be recovered as a solid product. Copper nicotinate and copper picolinate are also soluble in nitric acid.

The invention includes not only the oxidation of a 2,5-dialkylpyridine to a metal salt of isocinchomeronic acid but also the further stage of converting said metal salt to the free carboxylic acid. In this latter step, the metal salt is heated with an excess of alkali, preferably an alkali hydroxide, for example, sodium hydroxide. When the copper salt has been used, copper oxide precipitates out at this point and is readily removed by filtration. The sodium salt remains dissolved in the filtrate. On addition of sulfuric acid or other strong inorganic acid thereto and acidification to a pH of 2.5, that is to the point at which substantially all of the carboxylic acid is present in the form of free acid rather than in combination with either sulfuric acid or a metal ion, the isocinchomeronic acid precipitates and may be separated by filtration. It will be seen that the use of an excess of the inorganic salt of copper or other metal entails no loss, inasmuch as the metal is almost completely available for subsequent use in the process, either dissolved in the nitric acid filtrate, which can readily be concentrated to the desired strength, or as precipitated oxide, which can be added directly in the moist, washed state.

The process of the present invention has a number of advantages that make it superior to prior art methods. It uses as starting materials compounds that are available and economically attractive, specifically 5-ethyl-2-methylpyridine and nitric acid. Particularly important are the excellent yields obtained and fully as significant the high quality of product secured, both of the metal salt of the carboxylic acid and the acid itself, without the necessity of laborious recrystallization procedures.

The invention has been described adequately in the foregoing, but many variations may be adopted in details of procedure, reaction conditions and reactants without departure from the scope of said invention.

I intend to be limited only by the following claims:

1. A process for the preparation of metal salts of isocinchomeronic acid, which comprises heating at a temperature above 140° C. and under superatmospheric pressure a 2,5-dialkylpyridine, nitric acid of a concentration between 10 and 60%, and a compound capable of yielding in the reaction medium ions of a bivalent metal taken from the group consisting of copper, zinc, and nickel, said compound being present in an amount greater than that necessary to provide 0.5 gram atom of metal for each mole of 2,5-dialkylpyridine, thereby forming metal diisocinchomeronate.

2. A process for the preparation of a copper salt of isocinchomeronic acid, which comprises heating at a temperature above 140° C. and at superatmospheric pressure 5-ethyl-2-methylpyridine, nitric acid of a concentration between 10 and 60%, and a compound capable of yielding copper ions in the reaction medium, said compound being present in an amount greater than that necessary to provide 0.5 gram atom of metal for each mole of 5-ethyl-2-methylpyridine, thereby forming copper diisocinchomeronate.

3. A process as claimed in claim 2, in which a net nitric acid ratio is used higher than 3.0 parts by weight of nitric acid per part of 5-ethyl-2-methylpyridine.

4. A process for the preparation of isocinchomeronic acid, which comprises heating at a temperature above 140° C. and under superatmospheric pressure 5-ethyl-2-methylpyridine, nitric acid of a concentration between 10 and 60%, and a compound capable of yielding copper ions in the reaction medium, said compound being present in an amount greater than that necessary to provide 0.5 gram atom of copper for each mole of 5-ethyl-2-methylpyridine; separating the precipitated crystals of copper diisocinchomeronate, and heating the crystals in the presence of excess alkali; separating the precipitated copper oxide from the solution; acidifying the solution with an inorganic acid to a pH of about 2.5; and separating the precipitated isocinchomeronic acid.

HENRY HENDERSON HERRING, Jr.

References Cited in the file of this patent

UNITED STATES PATENTS

| Number | Name | Date |
|---|---|---|
| 2,371,691 | Hawkinson et al. | Mar. 20, 1945 |
| 2,524,957 | Burrows et al. | Oct. 10, 1950 |